United States Patent
Bansemir et al.

(10) Patent No.: US 6,886,779 B2
(45) Date of Patent: May 3, 2005

(54) IMPACT-ABSORBING, LOAD-LIMITING CONNECTION DEVICE AND ROTARY WING AIRCRAFT HAVING SUCH A CONNECTION DEVICE

(75) Inventors: Horst Bansemir, Munich (DE); Jyrki Majamaeki, Unterhaching (DE); Walter Oefner, Otterfing (DE); Anton Bergmann, Prien (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 10/691,005

(22) Filed: Oct. 22, 2003

(65) Prior Publication Data

US 2004/0135029 A1 Jul. 15, 2004

(30) Foreign Application Priority Data

Oct. 23, 2002 (DE) ........................................ 102 49 517

(51) Int. Cl.$^7$ ............................................. B64D 27/00
(52) U.S. Cl. ...................................................... 244/54
(58) Field of Search ............................... 244/54, 55, 56, 244/121, 127, 131, 138 R, 139

(56) References Cited

U.S. PATENT DOCUMENTS

| | | | | |
|---|---|---|---|---|
| 2,050,187 A | * | 8/1936 | Klemperer et al. ........... 403/43 |
| 2,073,350 A | * | 3/1937 | Oshorn ........................ 244/38 |
| 2,391,275 A | * | 12/1945 | Shaw .......................... 74/581 |
| 3,493,082 A | * | 2/1970 | Bell ............................ 188/377 |
| 3,550,885 A | * | 12/1970 | Crabtree et al. ........ 244/138 R |
| 3,589,703 A | | 6/1971 | Brookman .................. 267/162 |
| 3,802,650 A | * | 4/1974 | Pisano ........................ 244/121 |
| 5,228,640 A | * | 7/1993 | Mouille ..................... 244/17.27 |
| 5,547,148 A | * | 8/1996 | Del Monte et al. ..... 244/104 FP |
| 5,732,905 A | * | 3/1998 | Krysinski ................ 244/17.27 |
| 5,984,233 A | * | 11/1999 | Snyder et al. ............... 244/119 |
| 6,024,326 A | * | 2/2000 | Godfrey et al. .......... 244/151 B |
| 6,135,252 A | | 10/2000 | Knotts ......................... 188/374 |
| 6,212,974 B1 | * | 4/2001 | Van Duyn ................ 74/606 R |
| 6,609,681 B2 | * | 8/2003 | Buder .......................... 244/54 |
| 6,669,393 B2 | * | 12/2003 | Schilling ....................... 403/2 |
| 2003/0057318 A1 | * | 3/2003 | Struzik et al. ........... 244/17.27 |

* cited by examiner

*Primary Examiner*—Teri Pham Luu
*Assistant Examiner*—Stephen A Holzen
(74) *Attorney, Agent, or Firm*—Davidson, Davidson & Kappel, LLC

(57) ABSTRACT

An impact-absorbing, load-limiting connection device includes a first connection structure, a second connection structure, a guiding mechanism, and at least one impact-absorbing, load-limiting sacrificial element disposed between the first and second connection structure. At least one of the first and second connection structures is moveable with respect to the other in a predetermined direction of movement corresponding to an anticipated main impact direction. The guiding mechanism is configured to guide at least one of the first and second connection structures along the direction of movement and includes at least one transverse force-absorbing guide element configured to absorb a force in a direction transverse to the direction of movement. The sacrificial element is disposed as to be uncoupled from a transverse load path of the transverse force-absorbing guide element, and is configured to be deformed and destroyed by a relative movement between the first and second connection structures upon application of predetermined maximum load. In addition, a rotary-wind aircraft, especially a helicopter, that includes at least one such connection device.

20 Claims, 5 Drawing Sheets

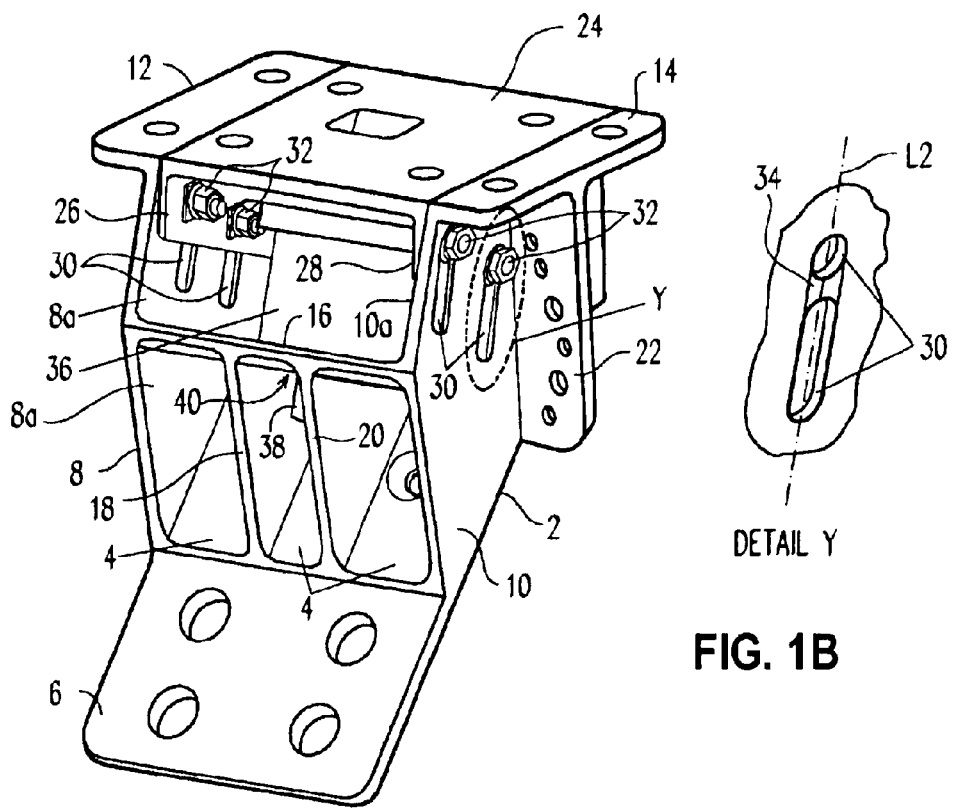
FIG. 1A
DETAIL Y
FIG. 1B
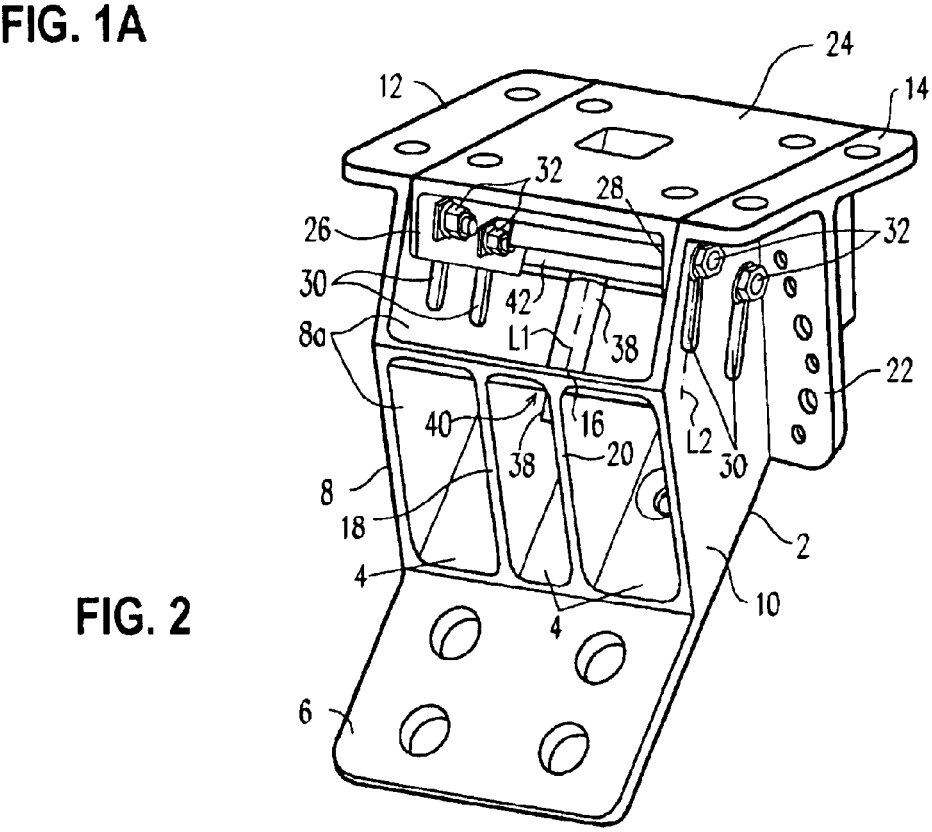
FIG. 2

IMPACT-ABSORBING, LOAD-LIMITING CONNECTION DEVICE AND ROTARY WING AIRCRAFT HAVING SUCH A CONNECTION DEVICE

Priority is claimed to German Patent Application DE 102 49 517.3, filed on 23 Oct. 2002, the entire disclosure of which is incorporated by reference herein.

BACKGROUND

The present invention relates to an impact-absorbing, load-limiting connection device, especially for connecting components or modules of a rotary-wing aircraft, as well as to a rotary-wing aircraft having such a connection device.

Over the past 30 years, major efforts have been made in automotive as well as aviation technology to improve the crash safety of automobiles and airplanes in order to protect the passengers in case of an accident, a hard emergency landing or a crash. Especially high demands are made of the crash safety of airplanes since, in comparison to automobiles, this type of machine is exposed to far greater loads in case of an accident. Developments in aviation so far have been aimed primarily at designing the undercarriage structures of passenger airplanes and helicopters so as to be more crash-safe. Here, fiber composite techniques are being used more and more often, especially carbon fiber composites with Kevlar composites as surface protection.

Among the various types of aircraft, the rotary-wing aircraft such as, for example, helicopters, are especially at risk in case of a crash due to their design and flight-specific attributes in comparison to conventional fixed-wing airplanes.

Whereas in case of a crash, fixed-wing airplanes generally follow a relatively flat angle of impact relative to the horizontal, the angle of impact of rotary-wing aircraft or helicopters is usually quite steep and can be at a value of 90° (vertical impact). Consequently, the main stress directions or main impact directions are very different with the above-mentioned types of aircraft. Unlike fixed-wing aircraft, rotary-wing aircraft or helicopters, for example, have massive and heavy structural components, such as gears, engine(s) and rotor(s) located at or on the top of the passenger cabin. In a crash, high accelerations and forces are exerted on these upper structural components, which thus greatly endanger the cabin and the passengers seated in the cabin. The high loads generated in case of a crash have to be transmitted and absorbed by the cabin structures such as, for example, the frame, which are subjected to far less of a load during normal operations. For this purpose, massive structural reinforcements are needed which, in turn, lead to unwanted high weights of these structures. Therefore, it would be desirable to be able increase the crash safety while reducing the structural weight.

Moreover, it should be taken into account that, in conventional airplanes, especially rotary-wing aircraft, even in case of a minor crash, quite considerable damage is done to so-called primary structures such as, for example, the cabin, or to other components that are not directly involved in a direct impact or the like. As a result, these components likewise have to be replaced after the crash, which leads to extremely high repair costs or ultimately even to a total loss. Hence, it would be desirable, also in the case of a fairly minor crash, to be able to reduce the severity of the damage or to limit this damage.

SUMMARY OF THE INVENTION

An object of the invention is to provide a connection device that allows a connection of two or more parts or components, that is improved in terms of crash safety and/or is suited for aviation applications. An alternative or additional objective is to provide a rotary-wing aircraft having such a connection device and that is improved in terms of crash safety.

The present invention provides an impact-absorbing, load-limiting connection device, comprising:
- at least a first and at least a second connection structure, which can be moved relative to each other;
- a guiding mechanism that guides the connection structures that can be moved relative to each other in a predetermined lengthwise direction of movement, which essentially corresponds to a main impact direction, and that has at least one transverse force-absorbing guide element with respect to the lengthwise direction of movement; and
- at least one impact-absorbing, impact load-limiting sacrificial element that, uncoupled from a transverse load path of the transverse force-absorbing guide element, is arranged between the at least first connection structure and the at least second connection structure and, after reaching a predetermined maximum load that acts in the lengthwise direction of movement, is deformed and destroyed as a result of a relative movement that occurs between the connection structures.

The at least two connection structures serve, first of all, to securely connect at least two parts or components to each other, for example, an engine-gear unit and the cabin of a rotary-wing aircraft, under normal load conditions. As long as the maximum load is not exceeded, the at least two connection structures are preferably connected to each other in such a way that there is no relative movement between them. However, it is fundamentally conceivable, also below the maximum load, to allow a relative movement between the at least two connection structures, for example, by means of an intercalated spring-damper system or the like. Each of the connection structures advantageously has at least one attachment section for the specific component that is to be connected to another component by means of the device according to the invention or for any connection means that is intercalated between these components.

The lengthwise direction of movement that is predetermined for the relative movement of the connection elements can be effectuated by design measures since the main load direction or the main impact direction in a system that is at risk of crashing, a helicopter, for example, is generally known from familiar crash characteristics (see above).

The transverse force-absorbing guide element absorbs loads or forces that act transversely or laterally to the lengthwise direction of movement of the type that, in actual practice, result especially from force components of a crash-induced impact load oriented laterally or transversely to the lengthwise direction of movement, said impact load not being exerted precisely parallel to the lengthwise direction of movement.

The sacrificial element, which is, in fact, a replaceable, disposable element, preferably brings forth its impact-absorbing, impact load-limiting effect only once the maximum load acting in the lengthwise direction of movement has been reached or exceeded. Below the maximum load, the sacrificial element is advantageously load-free. The sacrificial element is preferably constructed and arranged in such a way that it is subjected to pressure load exclusively axially by said maximum force. Fundamentally, however, it is also conceivable to subject the sacrificial element to tensile load.

As already mentioned, the sacrificial element is uncoupled from the transverse load path of the transverse force-absorbing guide element. This means that, under normal load conditions as well as in case of a crash, the sacrificial element is essentially free of transverse or lateral forces acting on the connection device or on its individual parts. This uncoupling is ensured, at least in case of a crash, by the transverse force-absorbing guide element; under normal load conditions, other components of the device might also be able to take over transverse or lateral force-dissipating functions.

The uncoupling ensures that the sacrificial element is only subjected to load in a predetermined direction, namely, in the lengthwise direction of movement, in case of a crash, even with an asymmetrical or obliquely oriented impact load of the kind that generally occurs in actual practice, and that said sacrificial element can optimally absorb the acting forces and it can have an impact-absorbing and load-limiting effect. The inventors have recognized that certain, highly effective impact-absorbing and load-limiting sacrificial elements are highly sensitive to non-axial loads and therefore cannot adequately bring forth their positive effect without additional measures. The above-mentioned uncoupling makes it possible to use this especially effective type of sacrificial elements, as will still be explained in greater depth below.

The maximum load at which the sacrificial element is destroyed as a result of a relative movement between the connection structures due to the direct or indirect effect thereof can be specified on the basis of the material properties of the sacrificial element as well as its dimensions or configuration. By the same token, the load-limiting and impact-absorbing properties of the sacrificial element can be predetermined. Other parts of the device in which the sacrificial element is installed have to be appropriately coordinated with these properties of the sacrificial element.

Consequently, the device according to the invention comprises two special partial structures that each have a special task. The first partial structure is the impact-absorbing, load-limiting sacrificial element that, under a load that acts parallel to the lengthwise direction of movement, has a good force peak ratio and load-deformation behavior at a predetermined maximum load and/or deformation. The force peak ratio is defined here as the ratio between the maximum occurring load and the mean load.

The second partial structure, namely, the guiding mechanism with its at least one transverse force-absorbing guide element can transmit lateral transverse loads with very slight lateral deformations. Additionally, the guiding mechanism can also participate in the axial deformations, i.e. the deformations that occur in the lengthwise direction of movement, or else it can follow these deformations until the sacrificial element is destroyed. Therefore, the second partial structure has lateral guiding properties during the crash event.

These guiding properties and the resultant uncoupling of the sacrificial element from lateral or transverse effects, in turn, are what make it possible to optimally use especially effective sacrificial elements that have a good force peak ratio with a low weight and a high specific energy absorption (the term specific energy absorption here refers to the energy absorption of the sacrificial element divided by the "crashed" weight). Thus, within the scope of the device according to the invention, for example, tubular sacrificial elements, especially cylindrical fiber composite tubes, can be used which, if they are guided sideways during the crash event, bring about the best force peak ratio at a very low weight and with the highest specific energy absorption. Laterally acting transverse loads and displacements, in contrast, would have a negative effect on the mode of operation of such tubular sacrificial elements. However, this is effectively avoided by the solution according to the invention since, due to the above-mentioned uncoupling or lateral guidance, the load during the deformation and destruction process can take place exactly axially (i.e. parallel to the lengthwise direction of movement) and centered.

Thus, through the interaction of two partial structures which have special properties, in case of a crash, a highly effective impact absorption as well as a limited load transmission to other structures is achieved, which makes it possible to considerably reduce and limit the damage. This applies equally to the case of a severe crash as well as a minor crash.

In particular with minor crashes, however, the device according to the invention and the shock-absorbing, impact load-limiting sacrificial element can effectively avoid damage to primary structures such as, for example, the cabin of a helicopter, or other components that are not directly involved in a direct impact or the like. After all, only the sacrificial element is deformed and destroyed. Here, thanks to its good force peak ratio and the high specific energy absorption, the sacrificial element absorbs most of the occurring loads and it prevents damage to adjacent parts and components. Therefore, as a rule, it is only necessary to replace the at least one sacrificial element while the adjacent parts and components remain undamaged or virtually undamaged. Consequently, it is generally not necessary to replace these parts, which contributes considerably to reducing the repair costs or even avoiding a total loss. In this manner, in case of a minor crash, the severity of the damage can be considerably reduced and the damage can be limited. Moreover, the parts or components that are connected to each other by the connection device according to the invention can now be configured lighter in weight and with less reinforcement, which leads to a substantial savings in weight. This is especially advantageous in aviation.

All in all, the connection device according to the invention creates a connection of two or more parts or components that is improved in terms of crash safety.

The present invention also provides a rotary-wing aircraft, especially a helicopter, comprising at least one impact-absorbing, load-limiting connection device as described above.

The impact-absorbing, load-limiting connection device here is preferably arranged in an area between a cabin and an engine of the rotary-wing aircraft or between the cabin and a gear unit associated with the engine.

A rotary-wing aircraft that is improved in terms of crash safety is thus provided. It is possible to reduce the destructive effect of massive and heavy structural components such as, for example, gears that are situated above the passenger cabin and that are connected to the cabin by means of the connection device according to the invention. In case of a crash, the loads generated by high negative accelerations on the gears are taken up by the at least one sacrificial element of the connection device according to the invention, thus being largely absorbed. Consequently, the effect of the load on the cabin structure can be limited. This, in turn, results in a far lower load on the entire cabin structure or adjacent cabin structures such as, for example, the frame. Hence, excessive damage to the cabin can be avoided.

Consequently, unlike in the prior art, there is no need for massive structural reinforcements that translate into unwanted high structural weights. Thus, a reduction of the structural weight can be achieved. At the same time, the risk potential stemming from heavy structural components situated above the cabin is quite considerably reduced for passengers inside the cabin in case of a crash. As a result, the safety and survival chances of the pilots, crew and passengers are enhanced. Regarding further advantages, reference is made to the embodiments of the connection device according to the invention.

BRIEF DESCRIPTION OF THE DRAWINGS

Preferred embodiments of the invention with additional configuration details and further advantages are described and explained in greater detail below with reference to the accompanying drawings, in which:

FIG. 1 shows a schematic perspective view of a connection device according to the present invention in a first embodiment in a first load state;

FIG. 2 shows a schematic perspective view of the connection device according to the invention of FIG. 1 in a partially disassembled state, in order to illustrate further details;

DETAILED DESCRIPTION OF THE PREFERRED EMBODIMENTS

Figure 3:
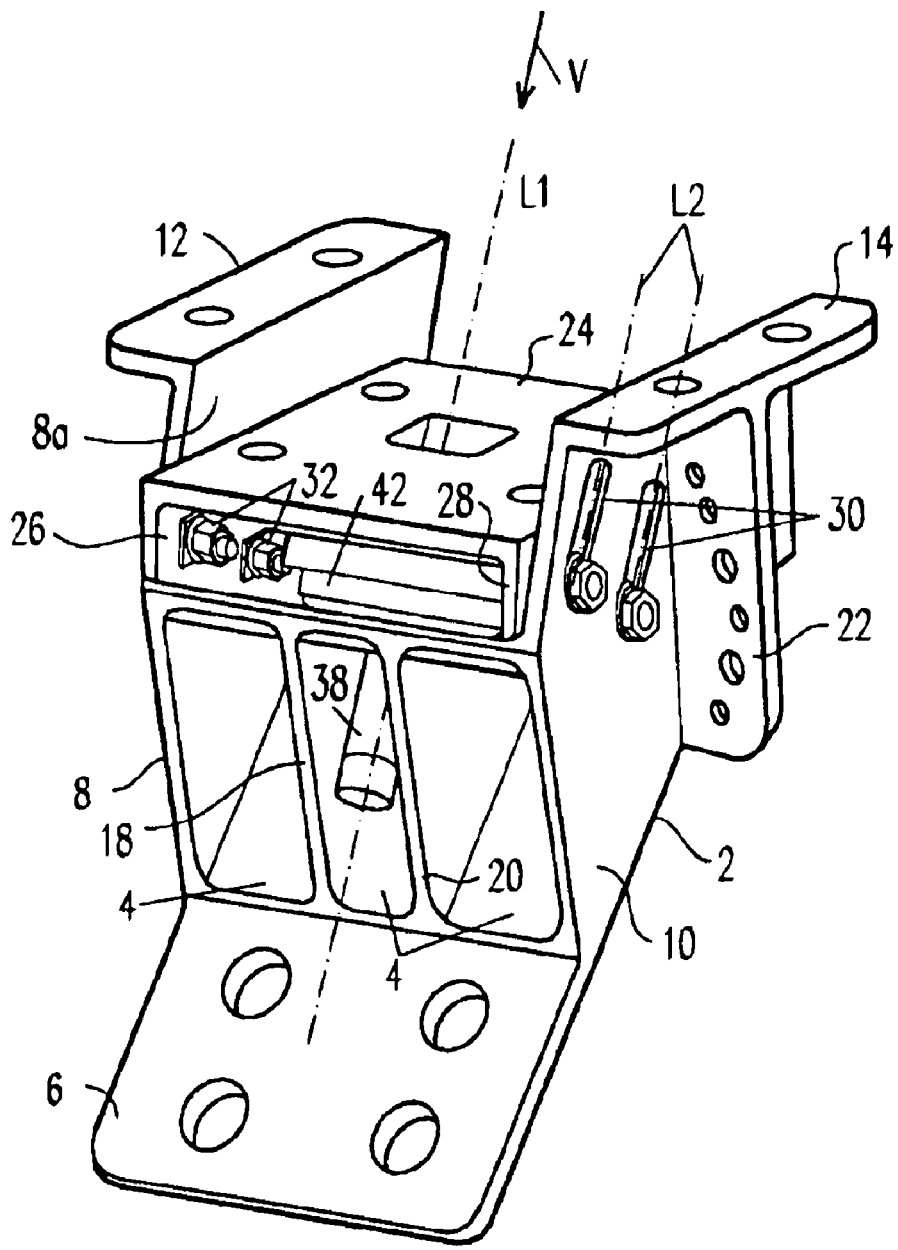
FIG. 3 shows a schematic perspective view of the connection device according to the invention of FIG. 1 in a second load state.

In the description below and in the figures, in order to avoid repetitions, the same parts and components are also designated with the same reference numerals whenever no further differentiation is necessary.

FIG. 1 shows a schematic perspective view of a connection device according to the invention in a first embodiment in a first load state, which corresponds to a state under normal load conditions (no crash). In the present example, several such connection devices are used to connect a gear-engine unit located above a helicopter cabin to said cabin. For the sake of clarity, these components are not shown here. Since the connection devices are configured identically, only one single connection device will be described below.

The connection device comprises a first and a second connection structure which can be moved relative to each other. In the present case, the first connection structure 2 is configured as a housing-like assembly that is made of a metal material, hereinafter simply referred to as housing 2. The housing 2 has a bottom wall 4 with a tab-like projection 6. The bottom wall 4 forms an attachment section for a frame connector of the helicopter cabin. Moreover, the housing 2 has two side walls 8, 10 that, on the top, each have a wall section 12, 14 that is angled towards the outside and that forms a connector for a metal tie (not shown here) that engages with the cabin. Between the side walls 8, 10 and below the angled wall sections 12, 14, there is an intermediate partition 16 that is supported on its bottom by two webs 18, 20 resting on the bottom wall 4. On the back of the housing 2, shown in the background in FIG. 1, there is a flange 22 for an engine assembly rail (not shown).

The second connection structure is configured in the form of a rectangular baseplate 24 which is movably mounted between the two side walls 8, 10 in the housing 2. The baseplate 24 has two side sections 26, 28 angled downwards that extend parallel and essentially free of play along the side walls 8, 10. The top of the baseplate 24 forms an attachment section for a strut (not shown) with which the gear-engine unit is connected to the helicopter cabin beyond the connection device according to the invention. In a normal load state of the connection device, the top of the baseplate 24 is aligned essentially flush with the top of the angled wall sections 12, 14.

As can also be seen in FIG. 1, in each side wall of the housing 2, there are two elongated holes 30, 30 that run parallel to each other and that extend from the top to the bottom. Moreover, the angled side sections 26, 28 of the baseplate 24 are each provided with two bores that are flush with the elongated holes 30, 30. A stud 32 is inserted through and secured in each elongated hole 30 and each bore.

The studs 32 can be subjected to shearing action in the area they are located in the side walls 8, 10. In the arrangement and position of the baseplate 24 shown in FIG. 1, there is a shear bridge 34 underneath the studs 32 in each elongated hole 30. This is schematically shown in "Detail Y" in FIG. 1.

Therefore, in the normal load state of the device, due to the safety mechanism made up of the studs 32 and the shear bridge 34, no movement of the baseplate 24 is possible relative to the housing 2. On the contrary, the baseplate 24 is securely attached to the housing 2 in the position shown in FIG. 1. This means that all of the loads that are exerted by the rotors, engine or gears on the helicopter cabin via the struts during normal flight operation of the helicopter can be positively and non-positively transmitted through the stud and shear bridge connection. That is to say, in this state, the housing 2 and the baseplate 24 form a fixed, unmovable unit. If, however, in case of a crash, the load becomes so great that it exceeds the maximum holding power achieved with the stud and shear bridge connection, then the effect of the positive and non-positive connection is overcome and the shear bridge 34 is sheared off. The baseplate 24 can then move in the housing 2.

As can also be seen in FIG. 1, between the bottom of the baseplate 24 and the top of the intermediate partition 16, there is an impact-absorbing, impact load-limiting sacrificial element 36. This sacrificial element 36 is ring-shaped or tubular and has a cylindrical inner and outer contour as well as an essentially uniform wall thickness. The tubular sacrificial element 36 in this example is a triggered (for an explanation, see remarks pertaining to FIGS. 9a to 9d) fiber composite tube made of a wrapped carbon fiber composite material. The tubular sacrificial element 36 is configured and dimensioned in such a way that, when it reaches a predetermined maximum load, which acts in the axial direction of the tube and which is greater than the maximum holding power, it is deformed and destroyed by the maximum load.

In the normal load state, i.e. when the maximum holding power is not exceeded, the sacrificial element 36 is held by the effective stud and shear bridge connection 32, 34 essentially load-free between the baseplate 24 and the intermediate partition 16 of the housing 2. The rectangular baseplate 24, which is fitted between the side walls 8, 10, additionally functions in cooperation with the side walls 8, 10 as a torsional safety mechanism that prevents a torsional load on the sacrificial element 36.

Additional details can be seen in FIG. 2 which, for purposes of illustration, shows a schematic perspective view of the connection device according to the invention of FIG. 1 in a partially disassembled state in which the sacrificial element 36 has been removed.

A sturdy guide pin 38 is provided on and securely attached to the bottom of the baseplate 24, and in the operational state of the connection device according to the invention (see FIG. 1), said bolt extends inside the tubular sacrificial element 36 and extends through the center thereof. At its lower end, the guide pin 38 fittingly engages into a passage and guide opening 40 that is provided in the area between the two webs 18, 20 in the intermediate partition 16. The length of the guide pin 38 is selected in such a way that, in the normal load state of the device, it projects slightly downwards from the passage and guide opening 40 (see FIGS. 1 and 2).

The upper end of the guide pin 38 associated with the bottom of the baseplate 24 has a ring-shaped shoulder 42 that serves as a positioning and centering section for the tubular sacrificial element 36. The sacrificial element 36 can thus easily be placed onto the ring-shaped shoulder 42, which facilitates the precise installation as well as replacement of the sacrificial element 36. In the operational state of the connection device according to the invention, the lower face of the tubular sacrificial element 36 lies on the intermediate partition 16 and the upper face lies on the ring-shaped shoulder 42 essentially free of play and free of load. At the same time, the ring-shaped shoulder 42 here ensures that the sacrificial element 36 does not slip sideways.

The longitudinal axis L1 of the guide pin 38 runs parallel to the longitudinal axes L2 of the elongated holes 30, 30. If the effect of the studs 32 and of the shear bridge 34 is eliminated because the maximum holding power has been exceeded, then the baseplate 24 can be moved in the direction of these parallel longitudinal axes L1, L2. Consequently, due to the previously explained arrangement of the longitudinal axes L1, L2, in case of a crash, a predetermined lengthwise direction of movement V of the baseplate 24 is defined that corresponds to the main load direction or the main impact direction that can be anticipated during a crash. The guide pin 38 can be moved together with the baseplate 24 in the lengthwise direction of movement V.

With the connection device according to the invention, in the first embodiment, the guide pin 38, in conjunction with the passage and guide opening 40, forms a transverse force-absorbing guide element relative to the lengthwise direction of movement V. Moreover, the insides 8a, 10a of the two side walls 8, 10, between which the baseplate 24 is fitted, in conjunction with the elongated holes 30, 30 and the studs 32 to which the baseplate 24 is attached, form a transverse force-dissipating guide path for the baseplate 24. Consequently, thanks to the guiding mechanism thus created, the baseplate 24 can be slid on the guide pin 38 as well as on the guide path 8a, 10a, 30, 30 in the transverse or lateral directions, while being supported in the lengthwise direction of movement V, and as the movement progresses, can exert a pressure load on the sacrificial element 36, thereby deforming and destroying it. The guidance and the transverse force support here prevent the sacrificial element 36 from being exposed during the above-mentioned processes to a force component oriented laterally or transversely relative to the lengthwise direction of movement V and from being able to tilt or become unevenly loaded.

In view of the construction described above, it is evident that the transverse force-absorbing effect of the guide pin 38 and of the guide path 8a, 10a, 30, 30 in the present case, however, is also present in the normal load state. This means that the sacrificial element 36, uncoupled from the transverse load path of the transverse force-absorbing guide elements 38, 40; 8.2, 10.2, is arranged between the bottom of the baseplate 24 and the top of the intermediate partition 16, both in a normal operating state as well as under crash conditions when it is deformed and destroyed.

FIG. 3 shows a schematic perspective view of the connection device according to the invention of FIG. 1 in a second load state that corresponds to a state during a crash. For the sake of a better overview, the representation of the sacrificial element 36 has also been left out in this figure. In case of a crash, due to the very high acceleration forces that occur, great loads are exerted onto the baseplate 24. The maximum holding power of the stud and shear bridge connection 32, 34 is exceeded and the shear bridge connection 34 is destroyed. The baseplate 24 can now move freely in the lengthwise direction of movement V and, starting from the position sketched in FIGS. 1 and 2, is displaced downwards (FIG. 3). Here, the baseplate 24 is guided by the guide pins 38, by the studs that run in the elongated holes 30, 30 and by the insides 8a, 10a of the side walls 8, 10, and it is supported laterally, i.e. in the transverse direction. When the baseplate 24 is displaced, it exerts pressure on the tubular sacrificial element 36. When a certain maximum load is reached, the sacrificial element 36 is markedly deformed and finally destroyed. In this process, it absorbs a great deal of energy and develops its impact-absorbing, load-limiting effect. During the deformation and destruction process, the sacrificial element 36 is exposed to the stabilizing guidance and support effect brought about by said guide elements which were already described above.

Figure 4:
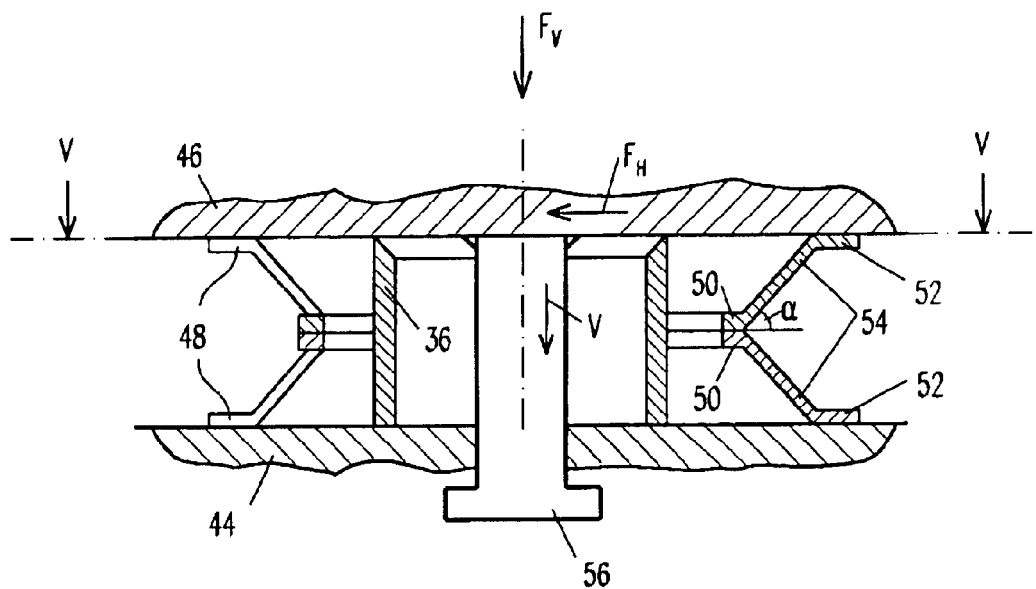
FIG. 4 shows a schematic longitudinal sectional view of a connection device according to the invention in a second embodiment.
Figure 5:
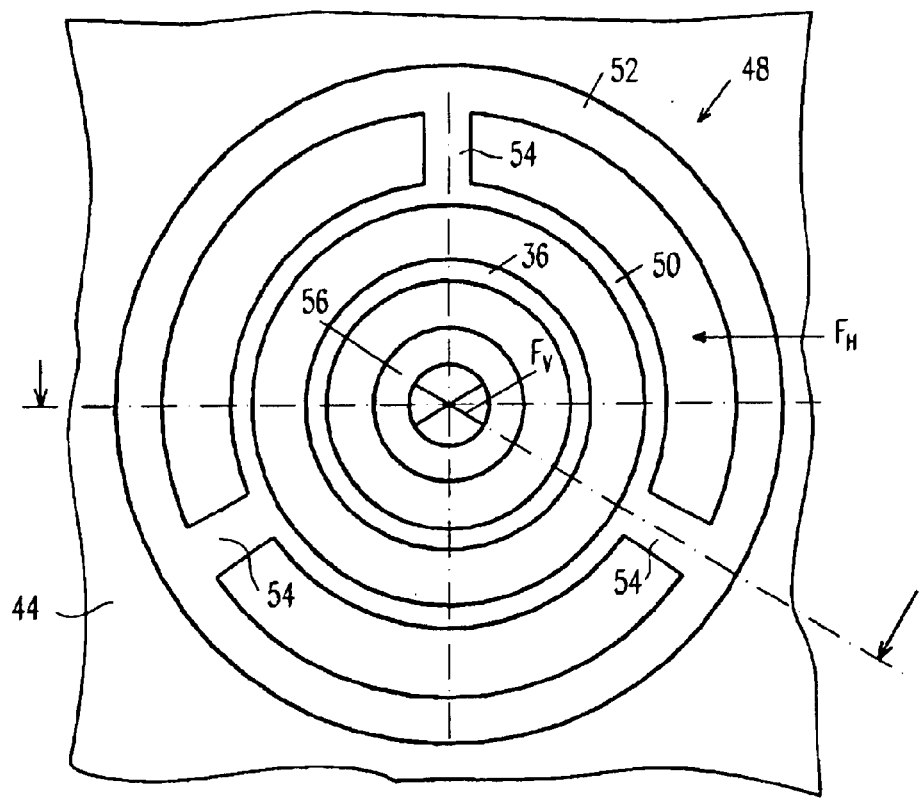
FIG. 5 shows a schematic sectional view of the connection device according to the invention in the second embodiment along Line V—V in FIG. 4.

FIG. 4 is a schematic longitudinal sectional view of a connection device according to the invention in a second embodiment. FIG. 5 shows a schematic sectional view of the connection device according to the invention in the second embodiment along the Line V—V in FIG. 4. The connection device, in turn, has a first connection structure 44 and a second connection structure 46 which, under a vertical load $F_V$, can be moved relative to each other in a vertical displacement direction that corresponds to a predetermined lengthwise direction of movement V. Between the connection structures 44, 46, there is a tubular or ring-shaped sacrificial element 36 made of a negatively triggered fiber composite tube (also see FIG. 9c in this context).

The transverse force-absorbing guide element in this case is comprised of two identical spring elements 48, each being easily compressible in the vertical direction and exhibiting shear rigidity in the transverse direction, and which, relative to the representation in FIG. 4 in a horizontal plane, each have a high quasi-isotropic transverse stiffness and are arranged mirror-image and symmetrically above each other. The upper spring element 48 in FIG. 4 is attached to the upper connection structure 46 and the lower spring element 48 is attached to the lower connection structure 44. They are attached by means of screws, rivets, adhesion or the like (not shown here). The spring elements 48, 48 are capable of transmitting high loads between the first and second connection structures.

As can be seen especially clearly in FIG. 5, the spring elements 48, 48 each have two concentric ring elements 50, 52 or ring disk elements of different diameters, which are coaxially at a distance from each other in the vertical direction and which are connected to each other via at least three webs or spokes 54 that are evenly distributed over each ring diameter and that are slanted with respect to the horizontal (transverse direction) by an angle α (see FIG. 4). The two spring elements are securely connected to each other via their inner ring disk elements 50. This can be achieved, for example, by means of screwed connections or adhesions, rivets or the like. The two ring disk elements 50, 52 of each spring element 48, 48 that are each connected to the three struts 54 constitute a structure that can easily be deformed in the vertical direction. If the angle α is reduced, then the structural height of the spring element 48 and its spring constant are also reduced, i.e. the spring element 48 becomes "softer". In order to bridge a predetermined height or a vertical distance between the two connection structures 44, 46 using spring elements 48, having a small angle α, as a rule, a larger number of spring elements 48 is needed in comparison to spring elements 48 having a larger angle α.

The tubular sacrificial element 36 is arranged coaxially inside the inner ring disk element 50 of the spring elements 48, 48. Thus, it is surrounded by the spring elements 48, 48 and as a result, it has an outer guide structure. A tie rod 56 extends through the tubular sacrificial element 36 and, in the present example, said tie rod 56 serves only to absorb tensile forces. The tie rod 56, similar to the variant according to FIGS. 1 to 3, however, could also be configured as an additional guide element.

Figure 6:
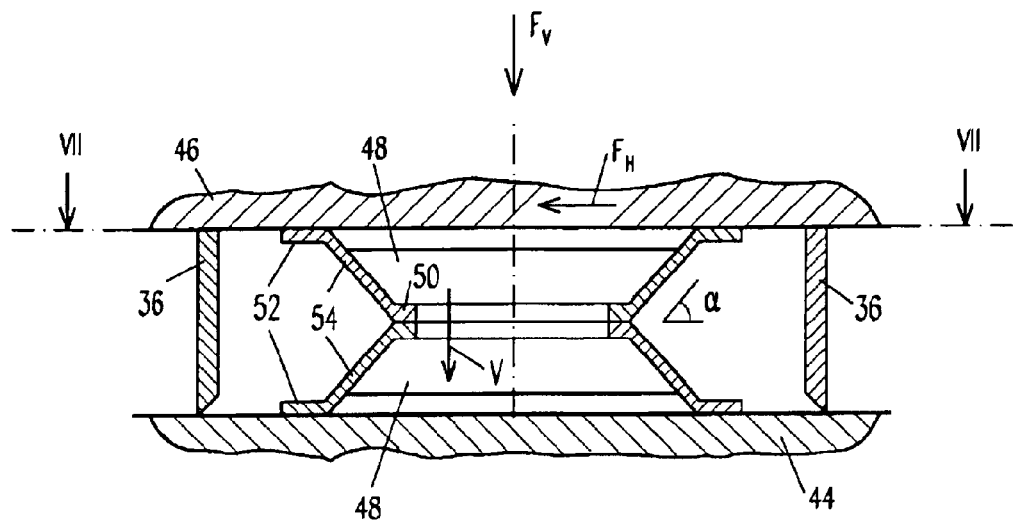
FIG. 6 shows a schematic longitudinal sectional view of a connection device according to the invention in a third embodiment.
Figure 7:
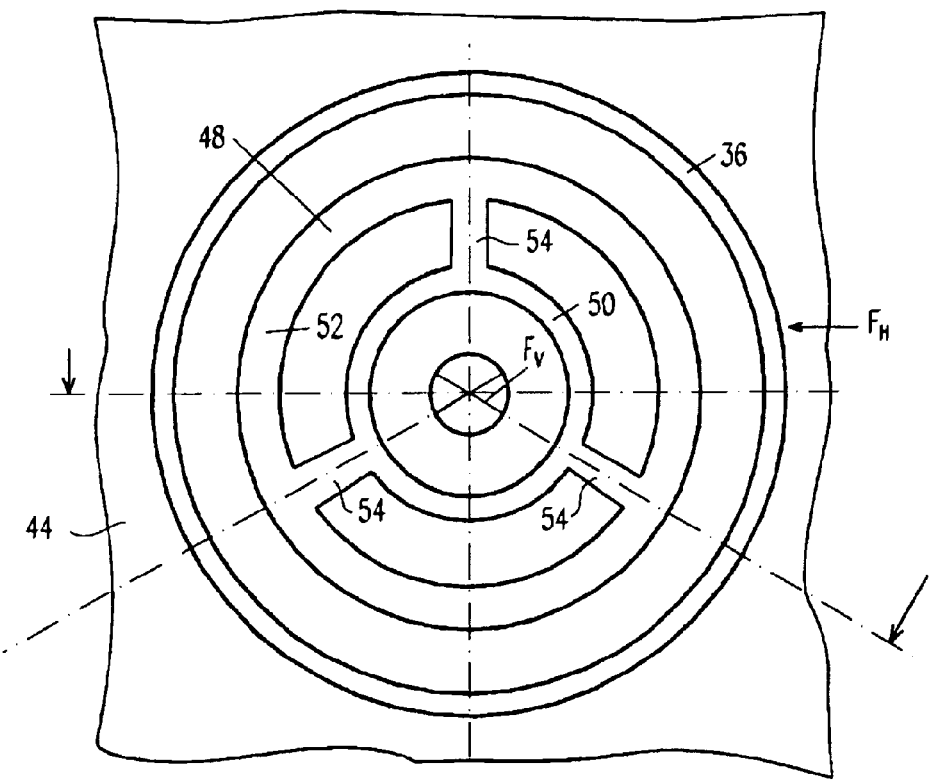
FIG. 7 shows a schematic sectional view of the connection device according to the invention in the third embodiment along Line VII—VII in FIG. 6.

FIG. 6 shows a schematic longitudinal sectional view of a connection device according to the invention in a third embodiment. FIG. 7 shows a schematic sectional view of the third embodiment along the Line VII—VII in FIG. 6. The third embodiment largely corresponds to the second embodiment according to FIGS. 4 and 5. In contrast, the spring elements 48, 48 that serve as transverse force-absorbing guide elements, however, are arranged inside the sacrificial element 36. Therefore, the sacrificial element 36 has an internal guide structure.

Figure 8:
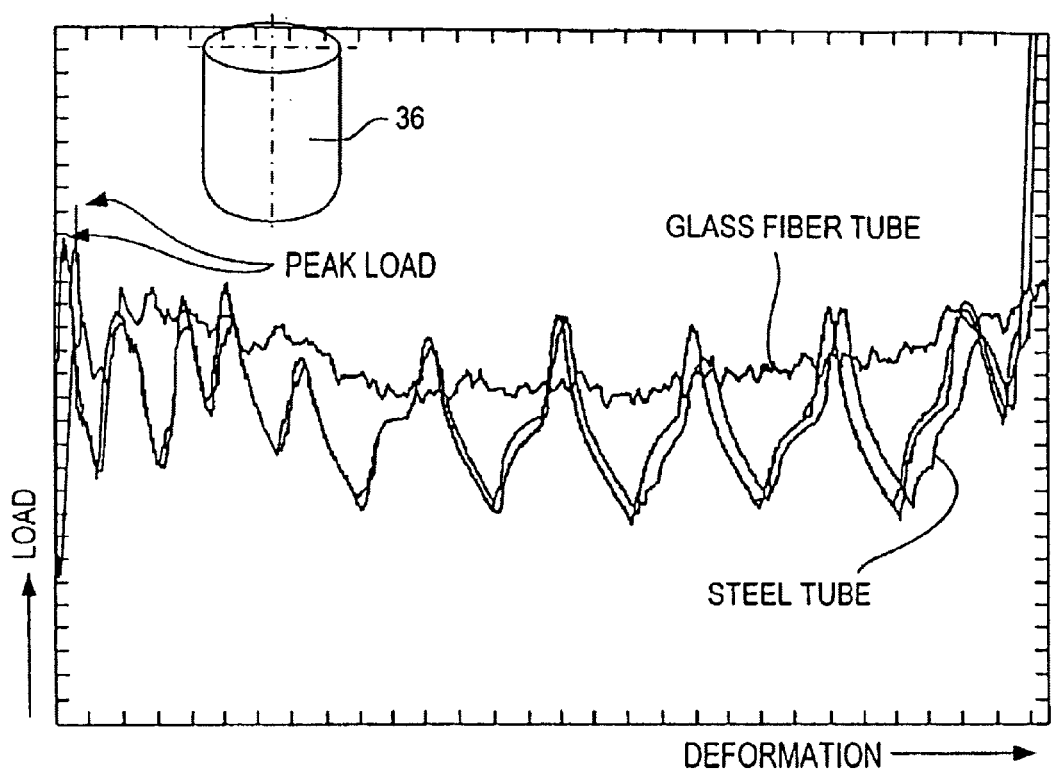
FIG. 8 shows a schematic diagram for illustrating the load-deformation behavior of sacrificial elements of the connection device according to the invention.

FIG. 8 shows a schematic diagram in order to illustrate the load-deformation behavior of sacrificial elements of the connection device according to the invention. To put it more precisely, the diagram shows the load-deformation behavior of a glass fiber composite tube and of three steel tubes. It can be recognized that the glass fiber composite tube exhibits a better force peak ratio than the metal tube. In experiments, it has been found that cylinders made of fiber composites, especially cylindrical fiber composite tubes, have the best force peak ratio along with maximum specific energy absorption. Sacrificial elements in the form of fiber composite tubes are thus the most effective impact-absorbing, impact load-limiting elements and are preferred within the scope of the present invention. Fundamentally, however, other impact-absorbing, impact load-limiting elements can also be used as sacrificial elements such as, for example, aluminum tubes, aluminum honeycomb composite tubes, cellular composite structures as well as sandwich composite elements.

Figure 9:
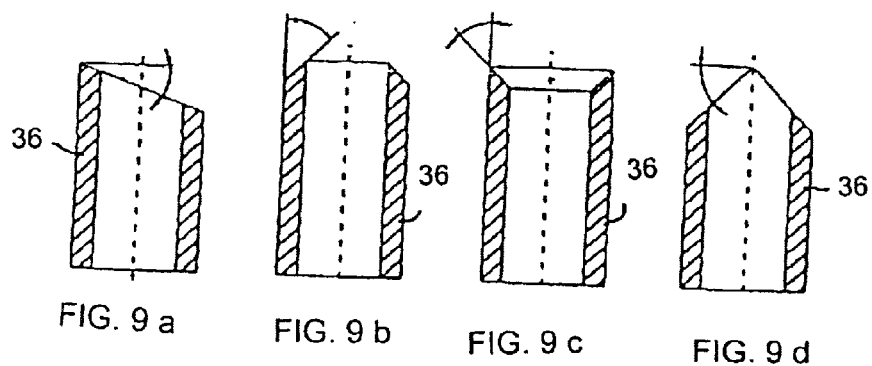
FIGS. 9a to 9d show schematic longitudinal sections through a so-called triggered sacrificial element of the connection device according to the invention.

FIGS. 9a to 9d each show a schematic longitudinal section through a so-called triggered sacrificial element of the connection device according to the invention. Trigger concepts are used to avoid excessive peak forces (see diagram in FIG. 8). They serve to define the extent of the break and the level of the peak force. The peak force can be reduced by means of a triggered sacrificial element 36. FIG. 9a shows a triggered tubular sacrificial element 36 with a slanted tube section on its end face. FIG. 9b shows a tubular sacrificial element 36 with a positive triggering, i.e. the tube has a conical tapering in the form of a bevel made on the outside of the end face. FIG. 9c shows a tubular sacrificial element 36 with a negative triggering, i.e. the tube has a conical tapering in the form of a bevel made on the inside of the end face. FIG. 9d shows a tubular sacrificial element 36 with a triggering in "tulip form", i.e. the tube has a tapering in the form of two slanted tube sections applied on the end face and symmetrically; the section planes intersect here in the longitudinal axis of the tubular sacrificial element indicated by a dotted line.

The invention is not limited to the above-mentioned embodiments which serve merely as a general explanation of the core idea of the invention. On the contrary, within the framework of the protective scope, the connection device according to the invention can also assume different configurations than the ones described concretely above. Thus, for example, it is also possible to configure the housing-like connection structure, as it was described in conjunction with FIGS. 1 to 3, as a fully encapsulated housing so that, if the sacrificial element is destroyed, no flying debris or the like can be released. The at least two connection structures between which the sacrificial element is arranged can also be configured as components that can telescope together, whereby the sacrificial element is arranged, for example, inside the components. With this design, the telescoping components can concurrently assume the function of a transverse or lateral force-absorbing guide element or optionally of a torsional safety mechanism.

Although in the embodiments described above, a tubular or ring-shaped sacrificial element with an essentially uniform wall thickness was described, differently shaped sacrificial elements can also be used. Thus, for example, conical tubes or tubes with varying wall thicknesses or else other symmetrical or asymmetrical cross section shapes are conceivable. Several tubular elements nested inside each other or having different lengths are also feasible. Moreover, sacrificial elements can be used that are not tubular in shape. Depending on the configuration of the transverse force-absorbing guide element, the sacrificial element can also be completely enclosed by the guide element or else by the guide element and the two connection structures.

Although it was the use of the connection device according to the invention for a rotary-wing aircraft, namely, a helicopter, that was described above, the invention is not limited exclusively to such an application. The connection device according to the invention can fundamentally also be used for fixed-wing airplanes or even for land and water vehicles or special machines. Thus, for instance, it is conceivable to install the connection device according to the invention into an automobile in a horizontal arrangement between the motor and an adjacent chassis structure in order to improve the crash safety in case of rear-end collisions and the like.

Reference numerals in the claims, in the description and in the drawings merely serve for better understanding of the invention and are not intended to limit the scope of protection.

What is claimed is:

1. An impact-absorbing, load-limiting connection device, comprising:
   a first connection structure;
   a second connection structure, at least one of the first and second connection structures being moveable with respect to the other in a predetermined direction of movement corresponding to an anticipated main impact direction;

a guiding mechanism configured to guide at least one of the first and second connection structures along the direction of movement, the guiding mechanism including at least one transverse force-absorbing guide element configured to absorb a force in a direction transverse to the direction of movement; and at least one impact-absorbing, load-limiting sacrificial element disposed between the first connection structure and the second connection structure and uncoupled from a transverse load path of the transverse force-absorbing guide element, wherein the sacrificial element is configured to be deformed and destroyed by a relative movement between the first and second connection structures in the direction of movement upon application of a predetermined maximum load.

2. The connection device as recited in claim 1, further comprising at least one fastening element having a predetermined holding power connecting the first and second connection structures, the at least one fastening element preventing the relative movement upon application of a load that is less than or equal to the predetermined holding power and allowing the relative movement upon application of a load that is greater than the predetermined holding power.

3. The connection device as recited in claim 1, further comprising at least one holding element configured to keep the sacrificial element in an essentially unloaded state upon application of a load that is less than or equal to the predetermined maximum load.

4. The connection device as recited in claim 1, wherein the sacrificial element is tubular.

5. The connection device as recited in claim 1, wherein the sacrificial element is a triggered tubular sacrificial element.

6. The connection device as recited in claim 4, wherein the tubular sacrificial element includes a fiber composite material.

7. The connection device as recited in claim 6, wherein the fiber composite material is wrapped.

8. The connection device as recited in claim 1, wherein the transverse force-absorbing guide element extends inside of the sacrificial element.

9. The connection device as recited in claim 1, wherein the transverse force-absorbing guide element surrounds the sacrificial element.

10. The connection device as recited in claim 1, wherein the transverse force-absorbing guide element includes a guide opening in the second connection structure and a guide bolt attached to the first connection structure and extending in the direction of movement, the guide bolt being moveable along with the first connection structure in the direction of movement and engaging the guide opening.

11. The connection device as recited in claim 1, wherein the transverse force-absorbing guide element includes at least one spring element disposed between the first and second connection structures and attached to at least one of the first and second connection structures, the spring element being compressible in the direction of movement and being highly loadable and having shear rigidity in a direction transverse to the direction of movement.

12. The connection device as recited in claim 11, wherein the spring element includes at least two concentric ring elements and at least three webs distributed evenly distributed around the ring elements and connecting the at least two concentric ring elements to each other, each of the at least two concentric ring elements having a different diameter and being disposed at a distance from the other ring element in the direction of movement, the at least three webs being slanted with respect to a transverse direction by an angle ($\alpha$).

13. The connection device as recited in claim 1, wherein the transverse force-absorbing guide element has a quasi-isotropic transverse stiffness.

14. The connection device as recited in claim 1, wherein the guiding mechanism includes a transverse force-absorbing guide path, at least one of the first and second connection structure being guided along the guide path in the direction of movement while being supported in the transverse direction.

15. The connection device as recited in claim 1, wherein at least one of the transverse force-absorbing guide element, the first connection structure, and the second connection structure includes positioning portion for positioning the sacrificial element.

16. The connection device as recited in claim 15, wherein the positioning portion is for centering the sacrificial element.

17. The connection device as recited in claim 1, further comprising at least one torsional strain element configured to inhibit a torsional strain of the sacrificial element.

18. A rotary wing aircraft, comprising at least one impact-absorbing, load-limiting connection device as recited in claim 1.

19. The rotary wing aircraft as recited in claim 18, wherein the rotary wing aircraft is a helicopter.

20. The rotary-wing aircraft as recited in claim 18, further comprising a cabin and an engine, and wherein the at least one impact-absorbing, load limiting connection device is disposed between the cabin and the engine.

* * * * *